United States Patent
Senga et al.

(10) Patent No.: US 8,171,284 B2
(45) Date of Patent: May 1, 2012

(54) ENCRYPTION DEVICE, DECRYPTION DEVICE, ENCRYPTION METHOD, AND DECRYPTION METHOD

(75) Inventors: Satoshi Senga, Kanagawa (JP); Toshio Oka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 465 days.

(21) Appl. No.: 12/376,834

(22) PCT Filed: Jul. 31, 2007

(86) PCT No.: PCT/JP2007/064935
§ 371 (c)(1),
(2), (4) Date: Feb. 9, 2009

(87) PCT Pub. No.: WO2008/018318
PCT Pub. Date: Feb. 14, 2008

(65) Prior Publication Data
US 2010/0153705 A1    Jun. 17, 2010

(30) Foreign Application Priority Data
Aug. 11, 2006 (JP) .................. 2006-220105

(51) Int. Cl.
*H04L 29/06* (2006.01)
(52) U.S. Cl. .................... 713/160; 713/192
(58) Field of Classification Search .......... 713/154, 713/160, 192; 370/395.52
See application file for complete search history.

(56) References Cited

U.S. PATENT DOCUMENTS

| | | | |
|---|---|---|---|
| 7,017,042 B1 * | 3/2006 | Ziai et al. ........... | 713/161 |
| 7,023,863 B1 * | 4/2006 | Naudus et al. ....... | 370/401 |
| 7,865,717 B2 * | 1/2011 | Calcev et al. ....... | 713/153 |
| 2004/0085958 A1 * | 5/2004 | Oman ................. | 370/389 |
| 2004/0139339 A1 | 7/2004 | Yeh et al. | |
| 2005/0105506 A1 * | 5/2005 | Birdwell et al. ..... | 370/349 |

(Continued)

FOREIGN PATENT DOCUMENTS
JP    09-018473    *    6/1995
(Continued)

OTHER PUBLICATIONS
Kobayashi Nobuyuki, Machine translation of Japanese Patent Applicaion Publication No. 09-18473, "Data transmitter", Jan. 17, 1997.*

(Continued)

*Primary Examiner* — Jung Kim
*Assistant Examiner* — Carlos M De Jesus, Jr.
(74) *Attorney, Agent, or Firm* — Greenblum & Bernstein, P.L.C.

(57) ABSTRACT

An encryption device, a decryption device, an encryption method, and a decryption method effectively perform encryption and decryption by using a packet type judgment result. An encryption/decryption device includes a packet reception unit that acquires a packet, a first encryption engine that is formed by hardware and encrypts or decrypts a packet; and a second encryption engine that encrypts or decrypts a packet by using software. The encryption/decyption device also includes a head data identification unit that judges the real time feature of the acquired packet according to the header information on the acquired packet, and an encryption/decryption process judgment unit that decides the acquired packet encryption destination or decryption destination in accordance with the real time feature from the first encryption engine and the second encryption engine. Since it is possible to separate the encryption by hardware from encryption by software according to the packet real time feature, it is possible to effectively perform encryption and decryption.

7 Claims, 6 Drawing Sheets

U.S. PATENT DOCUMENTS

| | | | |
|---|---|---|---|
| 2006/0268841 A1* | 11/2006 | Nagaraj et al. | 370/352 |
| 2007/0091927 A1* | 4/2007 | Apostolopoulos et al. | 370/473 |
| 2007/0113095 A1 | 5/2007 | Marui et al. | |
| 2007/0276760 A1 | 11/2007 | Kanehara et al. | |
| 2008/0098239 A1 | 4/2008 | Wada et al. | |

FOREIGN PATENT DOCUMENTS

| | | |
|---|---|---|
| JP | 9-18473 | 1/1997 |
| JP | 2003-69555 | 3/2003 |
| JP | 2003-069555 * | 3/2003 |
| JP | 2003-069555 A * | 3/2003 |
| JP | 2006-505188 | 2/2006 |

OTHER PUBLICATIONS

Toru et al., Machine translation of Japanese Patent Application Publication No. 2003-069555.*

Office Action dated Aug. 9, 2011, in the corresponding Japanese Patent Application from Japan Patent Office.

* cited by examiner

PRIOR ART

ENCRYPTION DEVICE, DECRYPTION DEVICE, ENCRYPTION METHOD, AND DECRYPTION METHOD

TECHNICAL FIELD

The present invention particularly relates to an encryption apparatus, decryption apparatus, encryption method and decryption method for carrying out efficient encryption/decryption processing using packet type identification results.

BACKGROUND ART

In recent years, studies are underway on portable terminals and systems that use different communications functions depending on various uses of applications by mounting WLAN functions allowing high-speed data communications in a narrow area on the portable terminals capable of communications in a wide area and complementing communications. In line with the diversification of such communications techniques or applications, there is also a demand for assuring security while maintaining speed enhancement of packet transmission on a network, and the speed enhancement of networks is underway concurrently with standardization of network security standards including IPSEC.

Along with this trend, there is also a growing demand for speed enhancement of encryption/decryption apparatuses that encrypt packets on a network. Therefore, in order to meet the demand for speed enhancement also for small terminals with low CPU processing capacity typified by portable terminals, encryption/decryption apparatuses are making their debut, which are capable of realizing encryption/decryption faster than software processing by causing the encryption/decryption function to be executed on a hardware board.

Patent Document 1 discloses a conventional encryption/decryption apparatus that satisfies such a need. The conventional encryption/decryption apparatus disclosed in the document has a configuration as shown in FIG. 1. In the figure, reference numeral 10 is a main board and 20 is an encryption board. Reference numeral 11 is a packet receiving section that determines processings such as encryption, relay or discarding of the received packet, 13 is an encryption board control section that controls encryption 20 that performs encryption/decryption processing, 24 is a hardware encryption engine that performs actual encryption/decryption processing and 14 is a software encryption engine. Furthermore, reference numeral 12 is an encryption logic determining section that determines whether to perform the encryption/decryption processing by hardware or software and 15 is a packet transmitting section that transmits packets to a network.

Upon receiving a packet, packet receiving section 11 carefully examines its content, and, when encryption or decryption is necessary, transfers the packet to encryption logic determining section 12. Encryption logic determining section 12, having received the packet, determines whether to perform encryption/decryption processing by hardware or perform encryption/decryption processing by software for the packet, based on the encryption/decryption length of the packet (i.e. packet size). More specifically, a packet having a short encryption/decryption length is processed in software encryption engine 14 and a packet having a long encryption/decryption length is processed in hardware encryption engine 24. When encryption/decryption is finished, a packet which has been encrypted or decrypted is transferred to packet transmitting section 15, and transmitted outside from packet transmitting section 15.

As described above, the conventional encryption/decryption apparatus processes a packet that has a long encryption/decryption length and that therefore requires a long time for encryption/decryption processing, by hardware which allows high-speed processing, and processes a packet that has a short encryption/decryption length and that therefore requires a small amount of encryption/decryption processing and produces little difference in processing time between hardware and software, by software which is slower in processing than hardware, thereby realizing more efficient encryption/decryption processing on the whole.

Patent Document 1: Japanese Patent Application Laid-Open No. 2003-69555

DISCLOSURE OF INVENTION

Problems to be Solved by the Invention

Now, depending on the types of packets, cases occur where high speed processing is required even when the packet length is short.

However, since the conventional encryption/decryption apparatus takes no account of the types of packets (i.e. priority between applications), there is a risk that efficient encryption/decryption processing is not performed depending on the types of packets.

It is therefore an object of the present invention to provide an encryption apparatus, decrypt ion apparatus, encryption method and decryption method for allowing efficient encryption/decryption processing using packet type identification results.

Means for Solving the Problem

The decryption apparatus of the present invention adopts a configuration including: a packet acquiring section that acquires an encrypted packet; a first decrypting section that is made up of hardware and decrypts the encrypted packet; a second decrypting section that decrypts the encrypted packet by software; a packet identifying section that decides realtime performance of the acquired packet based on header information of the acquired packet; and a decryption destination determining section that determines a decryption destination for the acquired packet from the first decrypting section and the second decrypting section according to the realtime performance.

The encryption apparatus of the present invention adopts a configuration including: a packet acquiring section that acquires a packet; a first encrypting section that is made up of hardware and encrypts the packet; a second encrypting section that encrypts the packet by software; a packet identifying section that decides realtime performance of the acquired packet based on header information of the acquired packet; and an encryption destination determining section that determines an encryption destination for the acquired packet between the first encrypting section and the second encrypting section according to the realtime performance.

Advantageous Effect of the Invention

The present invention can provide an encryption apparatus, decryption apparatus, encryption method and decryption method for allowing efficient encryption/decryption processing using packet type identification results.

BEST MODE FOR CARRYING OUT THE INVENTION

Hereinafter, an embodiment of the present invention will be explained in detail with reference to the accompanying drawings.

Figure 1:
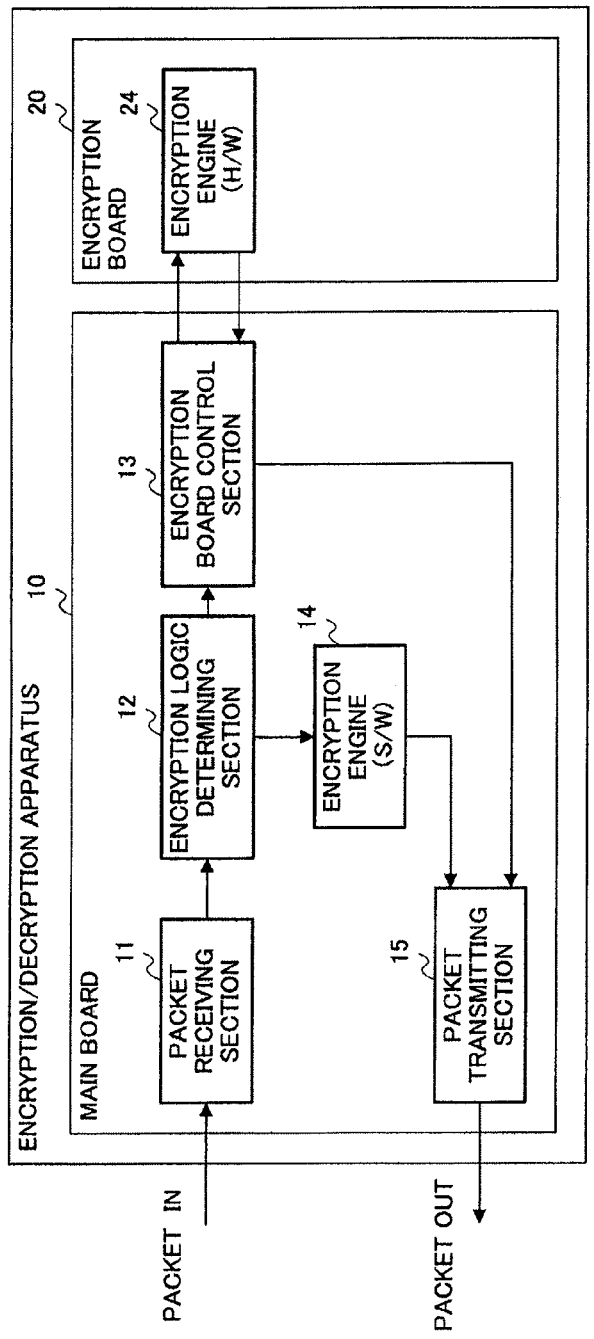
FIG. 1 is a block diagram showing a configuration of a conventional encryption/decryption apparatus.
Figure 2:
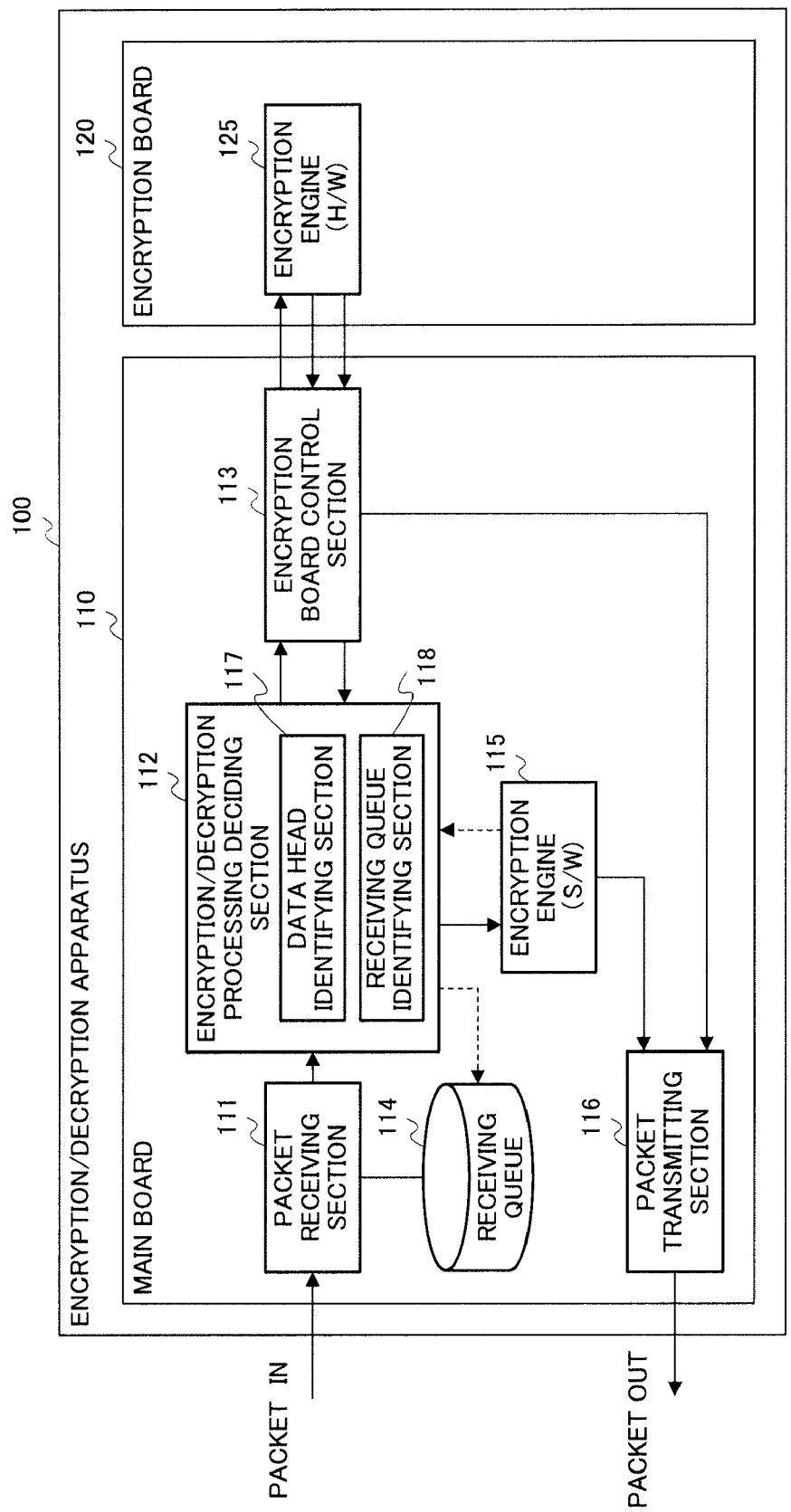
FIG. 2 is a block diagram showing a configuration of an encryption/decryption apparatus according to an embodiment of the present invention.

FIG. 2 is a block diagram showing a configuration of a packet encryption/decryption apparatus according to the present embodiment mounted, for example, on a portable terminal. As shown in the figure, encryption/decryption apparatus 100 shown in the same figure has main board 110 and encryption board 120.

Main board 110 has packet receiving section 111, encryption/decryption processing deciding section 112, encryption board control section 113, receiving queue 114 that stores a packet on a temporary basis, encryption engine 115 that encrypts or decrypts a packet by software, and packet transmitting section 116. On the other hand, encryption board 120 is made up of hardware and has encryption engine 125 that encrypts or decrypts a packet.

Packet receiving section 111 acquires a packet inputted to encryption/decryption apparatus 100, more specifically, a packet received from a network or a packet from an application in a higher layer operating on a portable terminal on which encryption/decryption apparatus 100 is mounted and determines processing such as encryption, relay and discarding with respect to this packet. When a plurality of applications are being executed simultaneously, packet receiving section 111 stores packets in receiving queue 114 on a temporary basis, and sends out the packets to encryption/decryption processing deciding section 112 in the order the packets are stored.

Encryption/decryption processing deciding section 112 includes data head identifying section 117 and receiving queue identifying section 118. Encryption/decryption processing deciding section 112 decides the realtime performance of the acquired packet based on header information of the acquired packet. Encryption/decryption processing deciding section 112 decides the encryption destination or decryption destination for the acquired packet according to the realtime performance thereof.

More specifically, when encrypting a packet, encryption/decryption processing deciding section 112 decides the realtime performance of the acquired packet based on the header information of the acquired packet. This is decided in data head identifying section 117. Encryption/decryption processing deciding section 112 sends out the acquired packet to encryption engine 125 of encryption board 120 made up of hardware when realtime performance is required of the acquired packet or sends out the acquired packet to encryption engine 115 that encrypts the packet by software when realtime performance is not required.

On the other hand, when decrypting a packet, encryption/decryption processing deciding section 112 stores the acquired packet, sends out the packet to encryption board 120 via encryption board control section 113 and decides, in the stage the header information about the packet sent out by encryption board 120 only is decrypted, the realtime performance of the acquired packet based on the decryption result of the header information only. That is, encryption/decryption processing deciding section 112 decides the realtime performance not based on a whole packet but based on header information at the head of a packet partially subjected to decryption processing. Encryption/decryption processing deciding section 112 continues the decryption of the packet in encryption engine 125 when realtime performance is required of the acquired packet, or, when realtime performance is not required, sends out the acquired packet stored to encryption engine 115, thereby switching the decryption destination for the acquired packet to encryption engine 115 that decrypts the packet by software. Since the header information of the acquired packet is encrypted, explanations here will be given assuming that encryption/decryption processing deciding section 112 decides the realtime performance using only the decryption result on the header information by hardware and adjusts the decryption destination for the acquired packet by watching the realtime performance, but the present invention is not limited to this, and, in a reverse manner, it is equally possible to send out a packet to decryption engine 115 that decrypts the packet by software first, decides the realtime performance using the decryption result of the header information only obtained there and adjust the decryption destination by watching this.

When receiving queue identifying section 118 decides the state of receiving queue 114 and particularly when receiving queue 114 stores no packet, that is, when no packet other than the acquired packet has been acquired at that moment, encryption/decryption processing deciding section 112 need not use the two encryption engines separately, and therefore sends out the packet to encryption engine 125 capable of high-speed decryption and performs control so that encryption engine 125 performs decryption of not the header information only but also the entire packet.

Encryption board control section 113 controls encryption board 120 that performs encryption/decryption processing.

Packet transmitting section 116 sends out the packet subjected to encryption/decryption processing in encryption engine 115 or encryption engine 125 to an actual network at the time of encryption or hands over the packet to an application in a higher layer operating on a portable terminal at the time of decryption.

The operations of encryption/decryption apparatus 100 having the above-described configuration at the time of encryption and decryption will be explained respectively.

Figure 3:
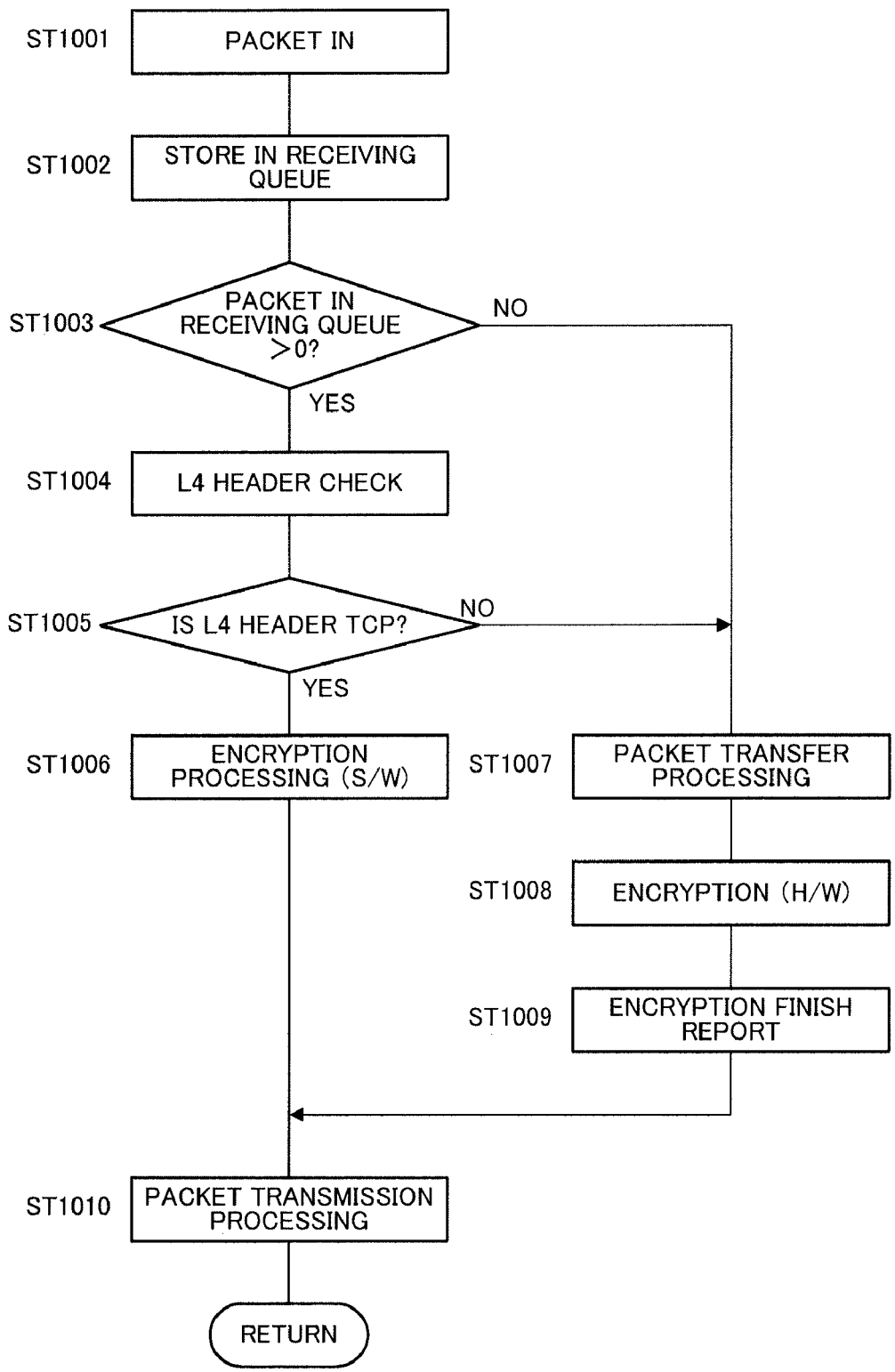
FIG. 3 is a flowchart showing a flow of encryption processing by the encryption/decryption apparatus in FIG. 2.

FIG. 3 is a flowchart showing the processing flow of encryption/decryption apparatus 100 when an application of the portable terminal encrypts a packet and carries out communications (that is, when the application carries out packet transmission).

In step 1001, when a packet from an application is inputted to encryption/decryption apparatus 100 and packet receiving section 111 acquires the packet, the packet is stored in the tail end of packet receiving queue 114 in step 1002. Packet receiving section 111 sequentially sends out a packet stored in the head of receiving queue 114 to encryption/decryption processing deciding section 112.

In step 1003, encryption/decryption processing deciding section 112 checks the number of packets in receiving queue 114 and decides whether or not receiving queue 114 stores packets other than the acquired packet.

When the decision result shows that packets are stored in receiving queue 114 (step 1003: "YES"), it is necessary to use encryption processing by hardware and encryption processing by software distinctively to realize efficient processing, and therefore encryption/decryption processing deciding section 112 checks the header information of the acquired packet (here, the transport layer header of Layer 4) (step 1004).

When the check result shows that the header of Layer 4 is a TCP header (step 1005: "YES"), it is decided that low realtime performance is required and encryption/decryption processing deciding section 112 sends out the acquired packet to encryption engine 115 and performs encryption processing by software (step 1006).

On the other hand, when the header of Layer 4 is not a TCP header (step 1005: "NO"), that is, UDP or the like, it is decided that high realtime performance is required and encryption/decryption processing deciding section 112 sends out (i.e. transfers) the acquired packet to encryption engine 125 (step 1007) and performs encryption processing by hardware (step 1008).

When the encryption processing by hardware is finished in step 1009, encryption engine 125 sends an encryption finish report to encryption board control section 113.

In step 1010, packet transmitting section 116 performs transmission processing on the packet encrypted in step 1006 or step 1008.

When the decision result in step 1003 shows that no packet is stored in receiving queue 114 (step 1003: "NO"), since there is no following packet, it is not necessary to adjust the encryption processing by software and the encryption processing by software, but processing by hardware in step 1007 to step 1009 is carried out to realize the fastest possible processing.

Figure 4:
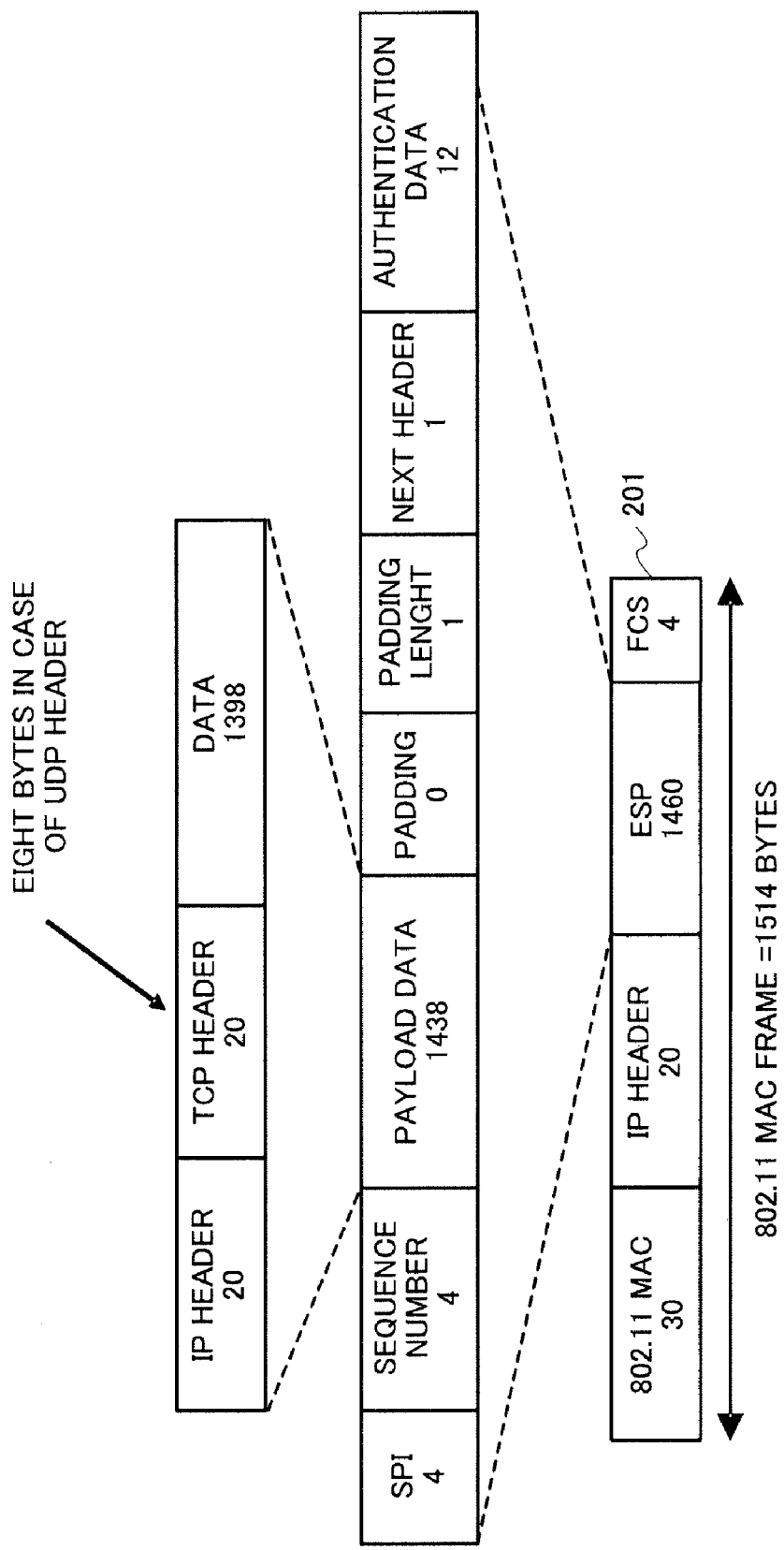
FIG. 4 shows a packet configuration example in tunnel mode.
Figure 5:
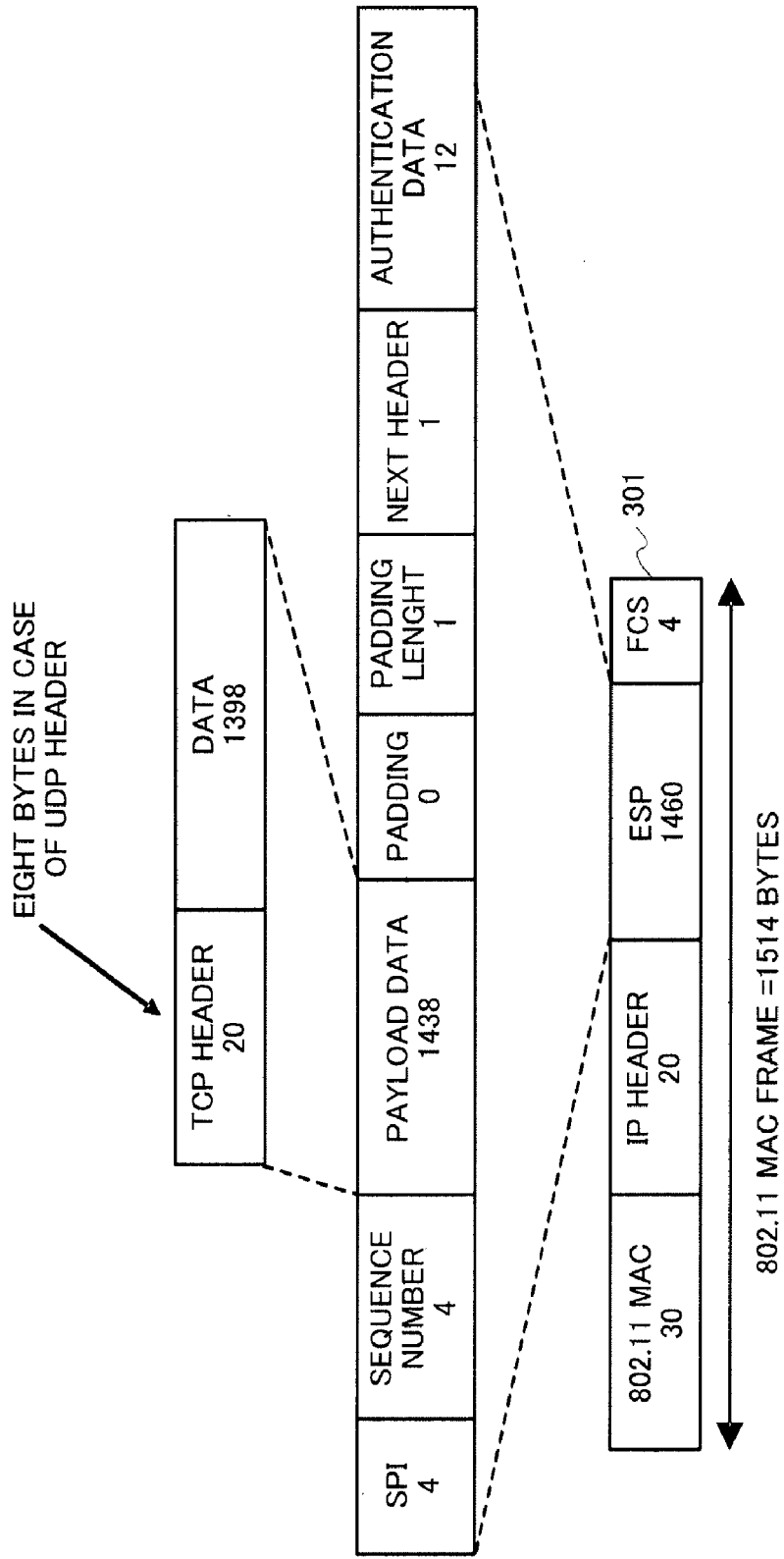
FIG. 5 shows a packet configuration example in transport mode.

Here, the configuration of a packet will be explained with reference to FIG. 4 and FIG. 5. FIG. 4 shows a packet configuration example in tunnel mode and FIG. 5 shows a packet configuration example in transport mode. Numbers described in their respective fields of a packet in both figures are the numbers of bytes assigned to the respective fields. Two types of tunnel mode and transport mode are provided as encapsulation modes when packets are encrypted (encapsulated) and communicated between computers. When encrypted packet communications is used only between computers, transport mode is used. On the other hand, tunnel mode is used when encrypted communications is established via a security gateway in encrypted packet communications between computers. While security of the IP payload section is mainly secured in transport mode, a security function is applied to the entire IP packet in tunnel mode.

As shown in the bottom of FIG. 4, packet 201 in tunnel mode is made up of a header of a normal data link layer (wireless LAN standard 802.11 MAC header in the same figure), IP layer header, ESP which is data to be encrypted and authentication field added at the end of the packet. Portions of ESP that are actually encrypted, are the payload data, padding, padding length and next header field parts. The other fields in ESP are the fields for storing information about the encryption function and information about the encapsulation mode or the like.

The payload data includes a 20-byte IP header followed by the transport layer header. The transport header field is assigned 20 bytes in the case of TCP and eight bytes in the case of UDP. The figure shows the case of TCP. The remaining portion (DATA field in the same figure) is data actually used by applications.

On the other hand, as shown in FIG. 5, packet 301 in transport mode is also made up of a header of normal data link layer (wireless LAN standard 802.11 MAC header in the same figure), IP layer header, ESP which is data to be encrypted and authentication field added at the end of the packet as in the case of packet 201. Furthermore, the roles of the data part to be encrypted and fields other than the field to be encrypted are also similar to those of packet 201 in tunnel mode. However, as for the payload data field, unlike tunnel mode, the transport layer header is constructed in the head. This transport header field is assigned twenty bytes in the case of TCP and eight bytes in the case of UDP.

Since the acquired packet has the configuration as shown in FIG. 4 and FIG. 5 above, in step 1004 and step 1005 in the flow of FIG. 3, the transport header part in the payload is checked to see whether the transport header part is TCP or not (e.g., UDP) and decide the realtime performance of the packet.

Figure 6:
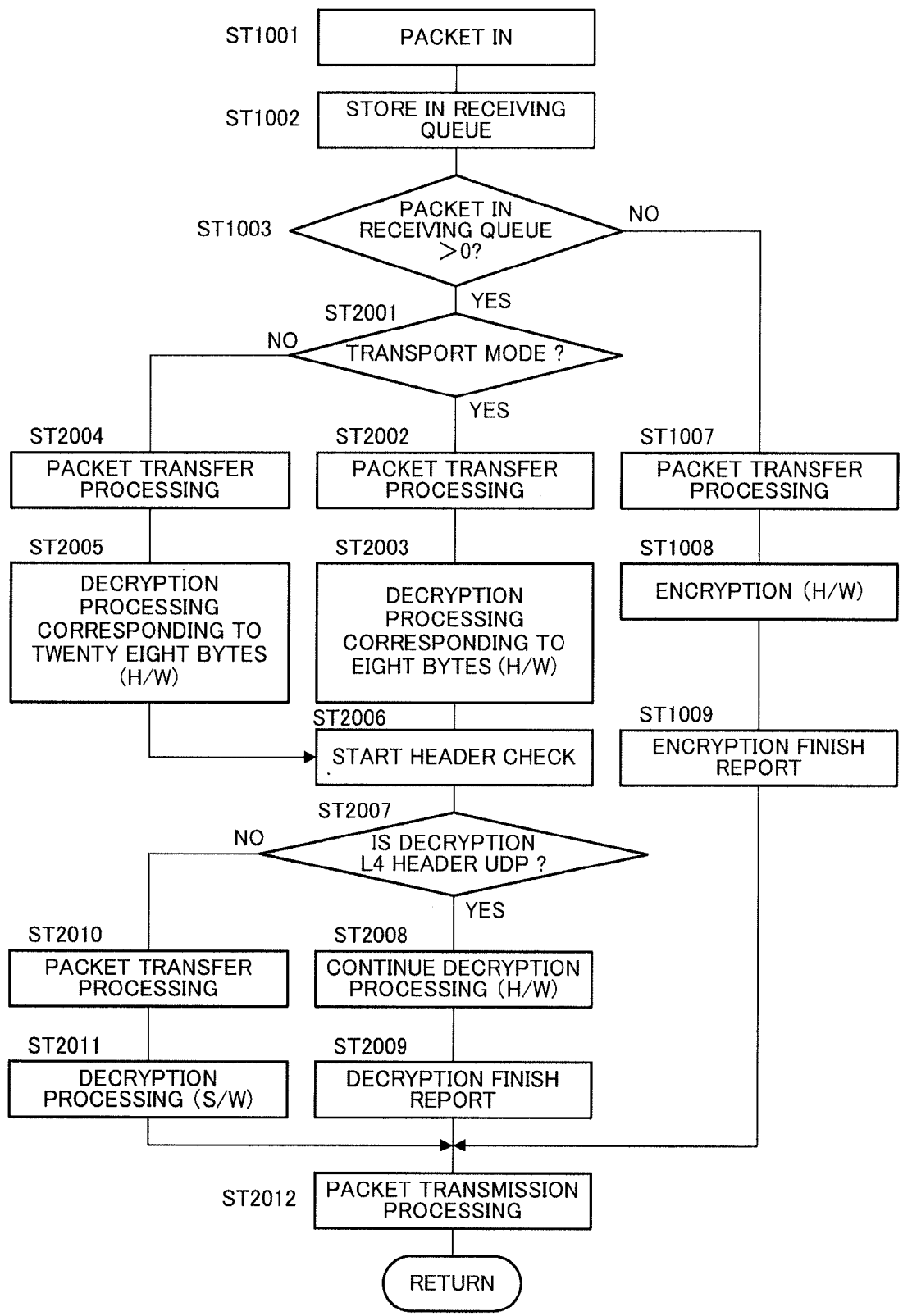
FIG. 6 is a flowchart showing a flow of decryption processing by the encryption/decryption apparatus in FIG. 2.

Next, the processing flow of encryption/decryption apparatus 100 when the application of the portable terminal decrypts a packet and carries out communications (that is, when the application receives a packet) will be explained with reference to FIG. 6.

In step 1001, when a packet is inputted to encryption/decryption apparatus 100 from a network and packet receiving section 111 acquires the packet, the packet is stored in the tail end of receiving queue 114 in step 1002. Packet receiving section 111 sequentially sends the packet stored in the head of receiving queue 114 to encrypt ion/decryption processing deciding section 112.

In step 1003, encryption/decryption processing deciding section 112 checks the number of packets in receiving queue 114 and decides whether or not packets other than the acquired packet are stored in receiving queue 114.

When the decision result shows that packets are stored in receiving queue 114 (step 1003: "YES"), the process moves to step 2001. When no packet is stored in receiving queue 114 (step 1003: "NO"), the process moves to step 1007 to step 1009. However, these steps are different from step 1008 and step 1009 in FIG. 3 in encryption and decryption.

From step 2001 onward, the processing of performing the above-described partial decryption differs depending on whether the mode is tunnel mode or transport mode. That is, it is necessary to decide the realtime performance of the acquired packet based on the decryption result of the transport header field of the payload data field irrespective of whether the packet is in tunnel mode or transport mode. However, as described above, since packets in tunnel mode and transport mode differ in the presence/absence of the IP header in the payload data field, the packets differ in the amount of data to be subjected to the above-described partial decryption.

More specifically, when the acquired packet is in transport mode (step 2001: "YES"), the acquired packet is sent out from encryption/decryption processing deciding section 112 to encryption engine 125 in step 2002 and in the stage in step 2003 decryption processing is performed on the acquired packet from the head of the payload data field to the part of the transport header field in which the UDP header may be placed (first header information), encryption/decryption processing deciding section 112 checks the decrypted first header information in step 2006. As for the first header information to be subjected to the decryption processing in step 2003, since the IP header is not placed in the head of the payload data field in the case of transport mode as shown in FIG. 5, encryption/ decryption processing deciding section 112 checks the decrypted first header information in step 2006 in the stage decryption processing is performed on eight bytes from the head of the payload data field.

On the other hand, in the case of tunnel mode instead of transport mode (step 2001: "NO"), the acquired packet is sent out from encryption/decryption processing deciding section 112 to encryption engine 125 in step 2004, and in the stage in step 2005 decryption processing is performed on the acquired packet from the head of the payload data field to the part of the transport header field in which the UDP header may be placed (first header information), encryption/decryption processing deciding section 112 checks the decrypted first header information in step 2006. Here, since a twenty-byte IP header is placed in the head of the payload data field, in the stage decryption processing is performed on twenty eight bytes from the head of the payload data field, encryption/decryption processing deciding section 112 checks the decrypted first header information in step 2006.

When the check result in step 2006 shows that the transport header is UDP (step 2007: "YES"), it is decided that high realtime performance is required and encryption/decryption processing deciding section 112 continues the decryption on the packet in encryption engine 125 (step 2008). In step 2009, when the decryption processing by hardware is finished, a decryption finish report is sent from encryption engine 125 to encryption board control section 113.

When the check result in step 2006 shows that the transport header is not UDP, that is, the transport header is TCP (step 2007: "NO"), it is decided that low realtime performance is required, in step 2010, encryption/decryption processing deciding section 112 sends out (i.e. transfers) the acquired packet stored to encryption engine 115 and thereby switches the decryption destination for the acquired packet to encryption engine 115 that performs decryption by software. In step 2011, encryption engine 115 decrypts the acquired packet by software.

In step 2012, packet transmitting section 116 transmits the packet decrypted in step 1009, step 2009 or step 2011 to an application in a higher layer of the portable terminal. Here, the transfer destination in step 2002 and step 2004 may also be encryption engine 115 by software. That is, the above-described partial decryption processing may also be performed by software.

As described above, the conventional encryption/decryption apparatus performs processing by hardware on packets having a long encryption/decryption length and processing by software on packets having a short encryption/decryption length without taking priority for each application or the like into consideration, whereas the encryption/decryption apparatus according to the present embodiment switches, when simultaneously executing a plurality of communications applications that need to be encrypted on a small terminal (e.g., packet communications using UDP with a high degree of realtime performance typified by a videoconference using IP packets on the Internet or packet communications using TCP not requiring realtime performance typified by downloading of files from the Internet or the like), encryption/decryption processing on various packets to processing by hardware on packets having a high degree of realtime performance with high priority or processing by software on packets having a low degree of realtime performance even if the encryption/decryption length is long or the like, according to the priority of each application. In this way, it is possible to prevent increased processing delay with respect to packets requiring realtime performance.

Thus, in accordance with the present embodiment, encryption/decryption apparatus 100 is provided with packet receiving section 111 that acquires an encrypted packet, encryption engine 125 made up of hardware that decrypts the encrypted packet, encryption engine 115 that decrypts the encrypted packet by software, data head identifying section 117 that decides the realtime performance of the acquired packet based on header information of the acquired packet and encryption/decryption identifying section 112 that decides a decryption destination for the acquired packet from encryption engine 125, and encryption engine 115 according to the realtime performance.

In this way, it is possible to decide the type of a packet, that is, decide realtime performance of a packet, which has not been done by the conventional encryption/decryption apparatus and divide packets into decryption by hardware and decryption by software according to this realtime performance, thereby carrying out efficient decryption processing. Packets having a high degree of realtime performance (mainly UDP packets) are preferentially allocated to hardware having high processing speed, thereby making it possible to suppress transmission delay to a minimum.

Furthermore, in the stage encryption engine 125 has decrypted the header information about the acquired packet only, data head identifying section 117 decides the realtime performance of the acquired packet based on the decryption result of the header information only, and when realtime performance is required of the acquired packet, encryption/decryption processing deciding section 112 continues the decryption on the acquired packet at encryption engine 125 and switches, when realtime performance is not required, the decryption destination for the acquired packet to encryption engine 115.

In this way, in the stage the header information about the acquired packet only has been decrypted, the realtime performance is decided based on not the entire packet but the decryption result of the header information only, thereby making it possible to minimize wasteful decryption processing which may occur when the decryption destination is switched. As a result, efficient decryption processing is possible.

In accordance with the present embodiment, encryption/decryption apparatus 100 is provided with packet receiving section 111 that acquires a packet, encryption engine 125 that is made up of hardware and encrypts the packet, encryption engine 115 that encrypts the packet by software, data head identifying section 117 that decides realtime performance of the acquired packet based on header information of the acquired packet and encryption/decryption processing deciding section 112 that decides an encryption destination for the acquired packet from encryption engine 125 and encryption engine 115 according to the realtime performance.

In this way, it is possible to decide the type of a packet, that is, decide realtime performance of a packet, which has not been done by the conventional encryption/decryption apparatus and divide packets into encryption by hardware and encryption by software according to this realtime performance, and thereby carry out encryption processing efficiently. Packets having a high degree of realtime performance (mainly, UDP packets) are preferentially allocated to hardware having high processing speed, and it is thereby possible to suppress transmission delays to a minimum.

The disclosure of Japanese Patent Application No. 2006-220105, filed on Aug. 11, 2006, including the specification, drawings and abstract, is incorporated herein by reference in its entirety.

INDUSTRIAL APPLICABILITY

The encryption apparatus, decryption apparatus, encryption method and decryption method of the present invention are useful as the apparatus and method capable of performing efficient encryption/decryption processing using packet type identification results.

The invention claimed is:

1. An apparatus, comprising:
a main board, which includes:
   a packet input unit for inputting a packet in a series of packets,
   a memory for buffering a received packet from the packet input unit, and
   an encryption/decryption processing deciding section for
      decrypting a designated portion of the received packet to obtain a value of a header field of an inner-packet, which is encapsulated as a data portion of the received packet, and
      determining a selected destination of two destinations to which the received packet, including the designated portion of the received packet, is to be sent and decrypted, based on the header field in the decrypted designated portion, and
   a first decryption engine, which is one of the two destinations, for decrypting the received packet; and
an external board, which includes:
   a second decryption engine, which is another one of the two destinations, for decrypting the received packet.

2. The apparatus according to claim 1,
wherein the decrypting of the designated portion of the received packet is performed by transferring the designated portion from the encryption/decryption processing deciding section to one of the first decryption engine and the second decryption engine.

3. The apparatus according to claim 1,
wherein the encryption/decryption processing deciding section determines a length of the designated portion based on whether an encryption was performed in a tunnel mode; or
transport mode.

4. The apparatus according to claim 1,
the encryption/decryption processing deciding section changes the destination based on whether the header field indicates that the received packet contains real-time traffic or not.

5. The apparatus according to claim 4,
wherein the encryption/decryption processing deciding section determines the selected destination based on whether the header field indicates that the received packet contains audio-data or not.

6. The apparatus according to claim 1,
wherein the first decryption engine decrypts the received packet using software, and the second decryption engine decrypts the received packet using hardware.

7. The apparatus according to claim 3,
wherein the length of the designated portion is determined to be either 8 bytes or 28 bytes.

* * * * *